United States Patent [19]

Hakulinen

[11] Patent Number: 4,956,887
[45] Date of Patent: Sep. 18, 1990

[54] METHOD OF METERING DETERGENT

[76] Inventor: Vesa Hakulinen, Kansakoulunkatu 2 A 5, SF-04400 Järvenpää, Finland

[21] Appl. No.: 333,047

[22] Filed: Apr. 4, 1989

[30] Foreign Application Priority Data

Apr. 7, 1988 [FI] Finland .................................. 881619

[51] Int. Cl.$^5$ .............................................. D06F 39/02
[52] U.S. Cl. ........................................ 8/158; 68/17 R; 68/207; 137/5; 137/93
[58] Field of Search ...................... 137/5, 93; 8/158; 68/12 R, 17 R, 207; 222/651

[56] References Cited

U.S. PATENT DOCUMENTS

| | | | |
|---|---|---|---|
| 3,554,212 | 1/1971 | Maroney | 137/93 |
| 3,592,212 | 7/1971 | Schleimer et al. | 137/93 |
| 4,211,517 | 7/1980 | Schmid | 137/93 X |
| 4,224,154 | 9/1980 | Steininger | 137/93 X |

FOREIGN PATENT DOCUMENTS

| | | |
|---|---|---|
| 927846 | 6/1963 | United Kingdom . |
| 1508469 | 4/1978 | United Kingdom . |
| 1530055 | 10/1978 | United Kingdom . |
| 2143655 | 2/1985 | United Kingdom . |

*Primary Examiner*—Philip R. Coe
*Attorney, Agent, or Firm*—Ladas & Parry

[57] ABSTRACT

The invention relates to a method of metering detergent into a washing solution in large washing apparatuses and systems comprising measuring from a washing solution containing water and detergent a property proportional to the detergent concentration of the washing solution, and adding detergent to the washing solution only during a predetermined metering period ($T_2$) when the detergent concentration corresponding to the property measured from the washing solution is below a predetermined threshold value during said metering period, and the addition of detergent being prevented after each metering period ($T_2$) for the time of a predetermined mixing period ($T_1$).

8 Claims, 1 Drawing Sheet

FIG. 1
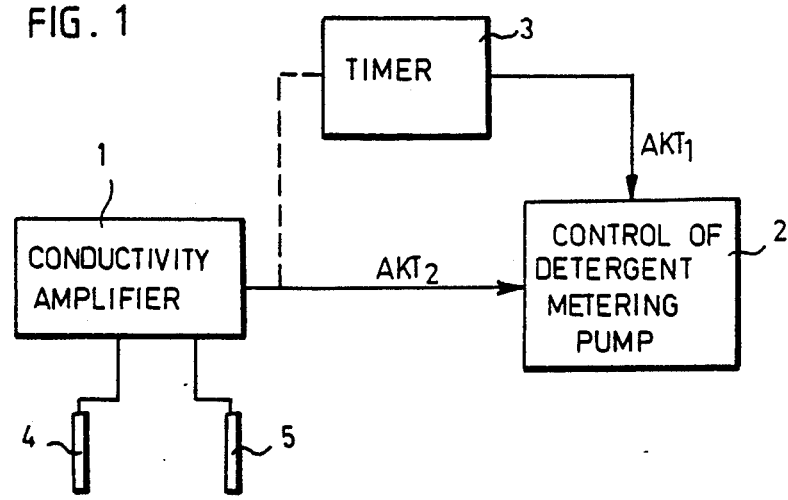
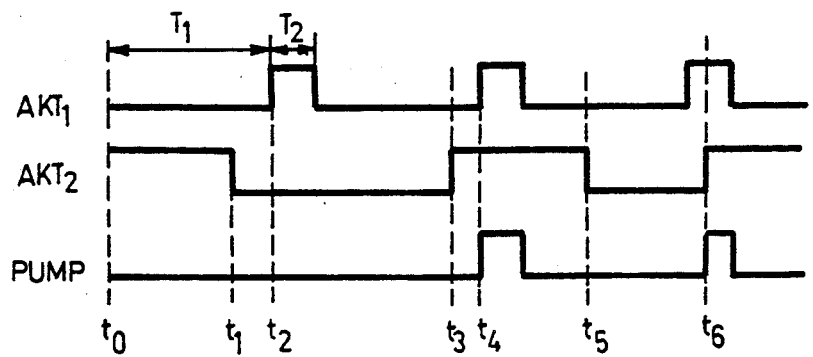
FIG. 2A
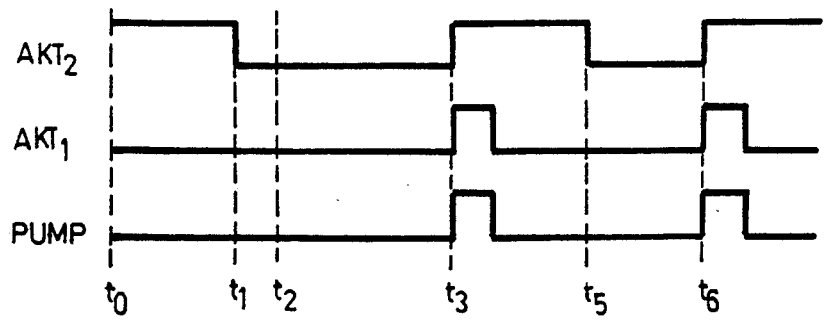
FIG. 2B

METHOD OF METERING DETERGENT

The invention relates to a method of and a device for metering detergent into a washing solution in large washing apparatuses and systems.

In prior art washing systems the detergent concentration of the washing solution is observed by measuring the electroconductivity of the washing solution between two electric electrodes immersed in the washing solution. The measurement is usually carried out by means of a conductivity amplifier which activates a detergent metering pump whenever the electroconductivity of the washing solution (and, as a consequence, the detergent concentration) drops below a predetermined threshold value until the threshold level has been regained. Since the conductivity amplifier may operate up to an accuracy of one hundredth part of a gram, it can be ensured under all circumstances that the detergent concentration and the washing effect are sufficient, i.e., that the detergent concentration remains constantly above a predetermined value. However, the detergent concentration in prior art washing systems exceeds considerably the threshold level yielding complete cleanness. This overdosage of detergent may constantly amount to tens of percents, at the starting stage of the washing apparatus up to hundreds of percents, which causes considerable extra detergent costs.

The detergent concentration of a washing solution can also be observed by measuring some other properties. For instance, laundries often use pH measurements because certain impurities in the washing solution, such as urine, affect the electroconductivity of the washing solution. The above-mentioned problems, however, also occur in connection with the measurement of other properties.

The object of the invention is to reduce substantially the overdosage of detergent.

This is achieved by means of a method of metering detergent into a washing solution in large washing apparatuses and systems, comprising measuring, from a washing solution containing water and detergent, a property proportional to the detergent concentration of the washing solution, and adding detergent to the washing solution if the value of the measured property corresponds to a detergent concentration below a predetermined threshold value, the addition of detergent being allowed only during a predetermined metering period for the time when the detergent concentration corresponding to the property measured from the washing solution is below said threshold value during said metering period, and that the addition of detergent is prevented after each metering period for the time of a predetermined mixing period.

The basic idea of the invention is that the detergent is added in small dosages periodically, and the detergent is allowed to mix with and dissolve in the washing solution for a determined period of time after each detergent dosage. In this way it can be ensured that no undissolved detergent affecting the measuring result is left in the washing solution at the beginning of the next metering period, and that the property then measured very accurately corresponds to the actual detergent concentration of the washing solution. If the property measured during the next metering period is below or above a predetermined limit value, detergent is added or not added to the washing solution, respectively. In prior art apparatuses detergent is added continually until the measured property reaches its set value. However, the actual detergent concentration of the solution cannot be determined by measuring a property, such as the pH or electroconductivity, immediately after the addition of detergent, because it takes time before the detergent is fully dissolved in water. In prior art apparatuses, such an error in the measuring results in a considerable overdosage of detergent before a sufficient amount of previously added detergent has dissolved in the solution for altering the measuring result to such an extent that the addition of detergent is interrupted.

Further in the present invention, detergent and washing water precipitated apart from each other are allowed to get mixed for a predetermined period of time after the starting of the washing system before the measuring result is regarded as valid. Electroconductivity or pH measured immediately after the start does not correspond to the actual detergent concentration of the washing solution, because the water and detergent have not yet been mixed with each other; therefore more detergent is added to the washing solution while it, in fact, has a sufficient detergent concentration.

The predetermined detergent concentration can be maintained with an accuracy equalling to the amount of detergent added during one metering period. In practice, an accuracy of up to a few tenth parts of gram can be obtained, whereas overdosages of up to 30–40% have been frequent previously.

In the following the invention will be described in more detail by way of example by means of a specific embodiment, referring to the attached drawings, wherein FIG. 1 illustrates an apparatus according to the invention by means of a block diagram; and FIGS. 2A and 2B are timing plans illustrative of the operation of the apparatus according to the invention.

In the embodiment to be described below, the measured property is electroconductivity and, accordingly, the measuring device is a conductivity amplifier or the like. When other properties of the washing solution are measured, a measuring device suited for the purpose in each particular case is used.

FIG. 1 shows a general block diagram of the apparatus according to the invention. Inputs in a conductivity amplifier 1 are connected to measuring electrodes 4 and 5 immersed in the washing solution at a suitable point within the washing system. The location of the measuring electrodes 4 and 5 is not critical; however, a measuring point positioned close to the detergent feeding point detects the effect of fed detergent more rapidly. The conductivity amplifier 1 measures the electroconductivity of the washing solution between the measuring electrodes 4 and 5 and generates at its output an activating signal $AKT_2$ when the measured electroconductivity drops below a predetermined threshold value corresponding to a determined detergent concentration.

The output of the conductivity amplifier 1 is connected to a control input in a control unit 2 for a detergent metering pump. An output signal $AKT_1$ from a timer 3 is connected to another control input in the control unit 2. The control unit 2 switches on the pump only if the signal $AKT_1$ from the timer 3 and the signal $AKT_2$ from the conductivity amplifier are applied simultaneously thereto.

FIG. 2A illustrates signals generated by the timer 3 and the electroconductivity amplifier 1 and their effect on the operation of the metering pump.

The timer 3 generates a periodic clock signal $AKT_1$ comprising two alternating periods: a longer mixing period $T_1$ during which the operation of the metering pump is prevented, and a shorter metering period $T_2$ during which the operation of the metering pump is allowed. In other words, the conductivity amplifier 1 is able to activate the detergent metering pump only during the metering period $T_2$. The length of the mixing period is dependent on the rate at which each detergent dissolves in water; widely-used alkali detergents dissolve fully in about 15-20 seconds. The length of the metering period $T_2$ depends on the desired accuracy and the amount of washing water. As a rule of thumb, it applies that the metering time $T_2$ is about 5 s per one thousand litres of water. The length of the mixing period is at least 2-4 times the length of the metering period. In FIG. 2A, the ratio is 1:4.

As shown in FIG. 2A, the metering means of the washing system are started at a moment $t_0$, and the first period generated by the timer is the mixing period $T_1$ in order that precipitated detergent has time enough to dissolve in water. At the starting moment $t_0$, the conductivity amplifier 1 detects that the electroconductivity of the washing solution is too low and applies the activating signal $AKT_2$ to the control unit 2. However, the control unit does not respond to the activating signal $AKT_2$ because the clock signal $AKT_1$ has the mixing period $T_1$. At a moment $t_1$ the detergent has dissolved in the water, and the amplifier 1 detects that the electroconductivity is sufficient and removes the activating signal $AKT_2$. As a consequence, the detergent metering pump does not introduce more detergent at a moment $t_2$ when the mixing period $T_1$ ends. At a moment $t_3$, the electroconductivity of the washing solution drops below the threshold value, and the conductivity amplifier 1 applies the activating signal $AKT_2$. At the beginning of the following metering period $T_2$, the metering pump is switched on, introducing detergent into the washing solution throughout the metering period $T_2$. Thereafter the added detergent dissolves in the washing solution during the mixing period $T_1$, and the electroconductivity of the washing solution reaches the threshold level at a moment $t_5$. Next time, the conductivity amplifier 1 applies the activating signal $AKT_2$ in the middle of the metering period $T_2$ at a moment $t_6$, whereby the metering pump introduces detergent up to the end of the metering period $T_2$.

Alternatively, the activating signal $AKT_2$ can be applied to the timer 3, as shown by the broken line in FIG. 1. Each time the electroconductivity drops below the threshold value and the conductivity amplifier 1 applies the activating signal $AKT_2$, the timer 3 begins the metering period $T_2$ and the mixing period $T_1$ follows if at least one mixing period has passed after the preceding metering period. Thereby the metering pump generally introduced detergent into the washing solution throughout the metering period $T_1$, the detergent dosage being always the same. This operational alternative is illustrated in FIG. 2B, in which the mixing period follows at the moment $t_0$ after the starting, and the operation of the metering pump is prevented. At the moment $t_3$ the conductivity amplifier 1 applies the activating signal $AKT_2$, as a result of which the timer 3 starts the metering period $T_2$, which is followed by the mixing period $T_1$.

In another alternative embodiment, the activating signal $AKT_2$ is also applied to the timer 3. In this case, however, the signal $AKT_1$ of the timer 3 starts with the mixing period $T_1$ when the conductivity amplifier 1 applies the activating signal $AKT_2$ in order that any instantaneous variation in the electroconductivity caused, e.g., by local variation in the detergent concentration or abrupt variation in the surface level of the washing solution would not cause metering of detergent. If the conductivity amplifier 1 applies the activating signal $AKT_2$ throughout the mixing period $T_1$, the metering period T2 follows in a normal way, then another mixing period $T_1$, etc., until the signal $AKT_2$ changes. If the output signal $AKT_2$ of the conductivity amplifier 1 changes already during the first mixing period $T_2$, no metering takes place.

In still another modification of FIG. 1, the signal $AKT_1$, for instance, can be omitted, and the timer 3 can be arranged to control a switch positioned between the output of the conductivity amplifier 1 and the control unit 2 of the metering pump. The timer 3 controls the switch in such a manner that the activating signal $AKT_2$ can be applied to the control unit 2 only during the metering period $T_2$.

The conductivity amplifier 1 and the control unit 2 of the metering pump shown in the block diagram of FIG. 1 belong to the prior art. The timer 3 can also be realized by means of simple commercially available timers. Of course, at least the blocks 2 and 3 may well be contained in a process computer controlling the washing system, etc.

The figures and the description related thereto are only intended to illustrate the invention. In their details, the method and the apparatus according to the invention may vary within the scope of the attached claims.

I claim:

1. A method of metering detergent into a washing solution in large washing apparatuses and systems, comprising measuring, from a washing solution containing water and detergent, a property proportional to the detergent concentration of the washing solution, and adding detergent to the washing solution if the value of the measured property corresponds to a detergent concentration below a predetermined threshold value, the addition of detergent being allowed only during a predetermined metering period for the time when the detergent concentration corresponding to the property measured from the washing solution is below said threshold value during said metering period, and that the addition of detergent is prevented after each metering period for the time of a predetermined mixing period.

2. A method according to claim 1, wherein after the starting of the washing apparatus or system, the metering process is initiated with he mixing period, whereafter the measuring and mixing periods alternate as a continuous sequence.

3. A method according to claim 1, wherein after the starting of the washing apparatus and system, the metering process is initiated with the mixing period, whereafter each metering period is initiated only when the detergent concentration corresponding to the property measured from the washing solution drops below said threshold value and at least one mixing period has passed after the preceding metering period.

4. A method according to claim 1, wherein after the initiation of the washing process or when the detergent concentration corresponding to the property measured from the washing solution drops below said threshold value, the mixing period precedes the adding step.

5. A method according to claim 1 wherein the length of the metering period is not more than about 5 seconds per one thousand liters of water, and the length of the mixing period is at least about 10 seconds.

6. A method according to claim 5 wherein the length of the mixing period is at least about 20 seconds.

7. A method according to claim 1 wherein said property is electroconductivity of the washing solution.

8. A method according to claim 1 wherein said property is the pH of the washing solution.

* * * * *